US010117226B2

(12) United States Patent
Huang et al.

(10) Patent No.: US 10,117,226 B2
(45) Date of Patent: Oct. 30, 2018

(54) METHOD, APPARATUS, AND SYSTEM FOR TRANSMISSION CONTROL OF MULTIMEDIA BROADCAST MULTICAST SERVICE DATA

(71) Applicant: Huawei Technologies Co., Ltd., Shenzhen (CN)

(72) Inventors: Qufang Huang, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 15/200,352

(22) Filed: Jul. 1, 2016

(65) Prior Publication Data

US 2016/0316453 A1 Oct. 27, 2016

Related U.S. Application Data

(63) Continuation of application No. 14/175,303, filed on Feb. 7, 2014, now Pat. No. 9,398,605, which is a (Continued)

(30) Foreign Application Priority Data

Aug. 8, 2011 (CN) .......................... 2011 1 0226133

(51) Int. Cl.
*H04H 20/71* (2008.01)
*H04W 72/00* (2009.01)
(Continued)

(52) U.S. Cl.
CPC ........... *H04W 72/005* (2013.01); *H04W 4/06* (2013.01); *H04W 72/121* (2013.01);
(Continued)

(58) Field of Classification Search
USPC ....... 370/229, 230, 235, 236, 252, 312, 328, 370/390, 395.4, 432
See application file for complete search history.

(56) References Cited

U.S. PATENT DOCUMENTS 9,191,222 B2 * 11/2015 Sun ..................... H04W 72/005
9,398,605 B2 * 7/2016 Huang ..................... H04W 4/06
(Continued)

FOREIGN PATENT DOCUMENTS

| CN | 101686431 A | 3/2010 |
|---|---|---|
| CN | 101909244 A | 12/2010 |

(Continued)

OTHER PUBLICATIONS

"SYNCProtocol for LTE; Discussion and Decision," 3GPP TSG-RAN WG3 Meeting #65, R3-091749, Aug. 24-28, 2009, 9 pages.
(Continued)

*Primary Examiner* — Kwang B Yao
*Assistant Examiner* — Nguyen Ngo
(74) *Attorney, Agent, or Firm* — Slater Matsil, LLP

(57) ABSTRACT

Embodiments of the present invention disclose a method, an apparatus, and a system for transmission control of multimedia broadcast multicast data. The method includes: according to a reference time, determining a scheduling period of suspending or resuming sending MBMS service data; and suspending or resuming sending the MBMS service data in the determined scheduling period. According to the embodiments of the present invention, transmission control of the MBMS service data by a base station can be realized, which facilitates each base station in the same MBSFA range synchronously suspending or resuming sending the MBMS service data of the same service, thereby facilitating reducing interferences in the service.

15 Claims, 14 Drawing Sheets

Related U.S. Application Data continuation of application No. PCT/CN2012/079808, filed on Aug. 8, 2012.

(51) Int. Cl.
  *H04W 4/06* (2009.01)
  *H04W 72/12* (2009.01)
  *H04W 84/04* (2009.01)

(52) U.S. Cl.
  CPC ... *H04W 72/1226* (2013.01); *H04W 72/1263* (2013.01); *H04W 84/042* (2013.01)

(56) References Cited

U.S. PATENT DOCUMENTS

| | | | |
|---|---|---|---|
| 2005/0190712 A1* | 9/2005 | Lee | H04L 12/1881 370/312 |
| 2006/0059407 A1 | 3/2006 | Wang et al. | |
| 2006/0067361 A1* | 3/2006 | Lee | H04W 72/005 370/466 |
| 2008/0318566 A1* | 12/2008 | Chun | H04W 48/12 455/422.1 |
| 2010/0315988 A1 | 12/2010 | Chen | |
| 2010/0323714 A1* | 12/2010 | Schmidt | H04W 48/18 455/456.1 |
| 2011/0086608 A1* | 4/2011 | Yamagishi | G08B 27/006 455/404.1 |
| 2011/0199973 A1* | 8/2011 | Li | H04W 72/005 370/328 |
| 2011/0274025 A1* | 11/2011 | Hsu | H04W 72/005 370/312 |
| 2012/0202493 A1* | 8/2012 | Wang | H04W 60/00 455/435.1 |
| 2012/0213142 A1* | 8/2012 | Van Lieshout | H04W 72/121 370/312 |
| 2014/0153475 A1 | 6/2014 | Huang et al. | |
| 2014/0362756 A1 | 12/2014 | Maeda et al. | |

FOREIGN PATENT DOCUMENTS

| | | |
|---|---|---|
| CN | 102035794 A | 4/2011 |
| EP | 2346204 A1 | 7/2011 |
| JP | 2011511589 A | 4/2011 |
| WO | 2005078962 A1 | 8/2005 |
| WO | 2009078152 A1 | 6/2009 |
| WO | 2013020503 A1 | 2/2013 |

OTHER PUBLICATIONS

"3rd Generation Partnership Project; Technical Specification Group Radio Accesss Network; Evolved Universal Terrestrial Radio Access E-UTRA) and Evolved Universal Terrestrial Radio Access Network (E-UTRAN); Overall description; Stage 2 (Release 10)," 3GPP TS 36.300 V10.4.0, Technical Specification, Jun. 2011, 194 pages.

Extended European Search Report, Application No. 12821815.3, Applicant Huawei Technologies Co., Ltd., dated Jun. 27, 2014, 6 pages.

Chinese Search Report of PCT, Application No. PCT/CN2012/079808, Nov. 22, 2012, 11 pages.

"3rd Generation Partnership Project; Technical Specification Group Radio Accesss Network; Evolved Universal Terrestrial Radio Access Network (E-UTRAN); M2 Application Protocol (M2AP); (Release 10)," 3GPP TS 36.443 V10.2.0, Technical Specification, Jun. 2011, 84 pages.

* cited by examiner

METHOD, APPARATUS, AND SYSTEM FOR TRANSMISSION CONTROL OF MULTIMEDIA BROADCAST MULTICAST SERVICE DATA

CROSS-REFERENCE TO RELATED APPLICATIONS

This application is a continuation of U.S. application Ser. No. 14/175,303 filed on Feb. 7, 2014, which is a continuation of International Application No. PCT/CN2012/079808, filed on Aug. 8, 2012, which claims priority to Chinese Patent Application No. 201110226133.7, filed on Aug. 8, 2011, both of which are hereby incorporated by reference in their entireties.

TECHNICAL FIELD

Embodiments of the present invention relate to communication technologies, and in particular, to a method, an apparatus, and a system for transmission control of multimedia broadcast multicast service data.

BACKGROUND

An MBMS mainly indicates that a network side may send multimedia service data with the same content at the same time to multiple terminals (also referred to as user equipment, abbreviated as UE), so that an air interface resource can be effectively saved, and a utilization ratio of the resource can be improved. A process of a control plane needs to be performed before MBMS service data in a long term evolution (LTE) communication system starts to be sent, so as to establish a bearer and allocate the air interface resource. In the process of the control plane, a data source triggers a control signaling along a gateway, a mobility management entity (MME), a multi-cell/multicast coordination entity (MCE), and a base station (E-UTRAN NodeB, abbreviated as eNB). Specifically, the data source sequentially informs the gateway about information such as characteristics of the service, requested resource, and expected areas to be sent to; the gateway assigns corresponding IP multicast addresses and transmits to the MME and the MCE; the MCE allocates an air interface transmission resource and informs each eNB; and the eNB joins a corresponding IP multicast group according to the IP multicast addresses assigned by the gateway, and according to the air interface resource information allocated by the MCE, updates a reserved sub-frame which is used for the MBMS transmission. After the process of the control plane ends, the MBMS service data which is of a user plane and is sent out by the data source flows through the gateway, and arrives at each eNB in the IP multicast group in a manner of IP multicast, and then is transmitted to the terminals by the eNB through the air interface.

In the LTE, the sending of the MBMS service data follows a transmission mode of multimedia broadcast multicast service single frequency network (MBSFN), that is to say, multiple eNBs in a certain area need to send the completely same MBMS service data in the same sub-frame, in this way, after the MBMS service data sent by the eNBs arrived at the terminals, the terminals cannot distinguish which eNB sends the signal, and the signals sent by the multiple eNBs may be superimposed and enhanced at the UE, thereby reducing a packet error ratio. The MCE suspends some services according to actual control needs of communication, that is, interrupts sending the MBMS service data of these services, so as to achieve the purpose of saving the air interface resource and reducing the power consumption of the eNB. The service suspension is temporary; and when the conditions needed for implementing the communication control are not satisfied, the sending of the MBMS service data of the suspended services needs to be resumed. The service suspension and the service resumption are performed in a range of a multimedia broadcast multicast service single frequency network area (MBSFN Area, abbreviated as MBSFA), and generally, one service may be transmitted in multiple MBSFA ranges. Therefore, the data source generally continues sending the MBMS service data of this service for the usage of an MBSFA whose service is not suspended.

The control signaling of the MBMS service data, that is, a multicast control channel (MCCH) message, is sent cyclically, and the MCE can only modify the MCCH message at some predefined time points, where a time interval between two time points when the MCCH message may be modified is referred to as an MCCH modification period, and each eNB in the same MBSFA range uses the same MCCH modification period number. When the MCE determines that a certain service needs to be suspended or resumed in a certain MBSFA range, the MCE firstly informs all the eNBs in the MBSFA range, and updates the MCCH message from a certain MCCH modification period, thereby ensuring that all the eNBs in the same MBSFA range synchronously update the MCCH message. However, the prior art does not provide a corresponding solution for how the eNB in the same MBSFA range realizes suspension or resumption control of the MBMS service data.

SUMMARY

The embodiments of the present invention provide a method, an apparatus, and a system for transmission control of multimedia broadcast multicast service data, so as to realize transmission control of the multimedia broadcast multicast service data.

In one aspect, an embodiment of the present invention provides a transmission control method for multimedia broadcast multicast service data, including: according to a reference time, determining a scheduling period of suspending or resuming sending multimedia broadcast multicast service data; and suspending or resuming sending the multimedia broadcast multicast service data in the determined scheduling period.

In another aspect, an embodiment of the present invention further provides another transmission control method for multimedia broadcast multicast service data, including: generating indication information including a reference time; and sending the indication information to each base station in the same multimedia broadcast multicast service single frequency network area range, so as to instruct the base station to determine, according to the reference time, a scheduling period of suspending or resuming sending the multimedia broadcast multicast service data.

In another aspect, an embodiment of the present invention provides a base station, including: a scheduling period determining module, configured to: according to a reference time, determine a scheduling period of suspending or resuming sending multimedia broadcast multicast service data; and a transmission control module, configured to suspend or resume sending the MBMS service data in the determined scheduling period.

In another aspect, an embodiment of the present invention further provides a network device, including: a generating module configured to generate indication information including a reference time; and a sending module configured to send the indication information to each base station in the same multimedia broadcast multicast service single frequency network area range, so as to instruct the base station to determine, according to the reference time, a scheduling period of suspending or resuming sending the multimedia broadcast multicast service data.

In another aspect, an embodiment of the present invention further provides a communication system, including the foregoing base station and the foregoing network device.

In the method, the apparatus, and the system for transmission control of multimedia broadcast multicast service data provided in the embodiments of the present invention, according to the pre-acquired reference time, the base station determines the scheduling period of starting suspending or resuming sending the MBMS service data, and suspends or resumes sending the MBMS service data in the determined scheduling period, so as to realize the transmission control of the MBMS service data by the base station. Through the embodiments of the present invention, it facilitates each base station in the same MBSFA range synchronously suspending or resuming sending the MBMS service data of the same service, thereby facilitating reducing interferences in the service.

BRIEF DESCRIPTION OF THE DRAWINGS

To illustrate the technical solutions in the embodiments of the present invention or in the prior art more clearly, the accompanying drawings required for describing the embodiments or the prior art are briefly introduced in the following. Apparently, the accompanying drawings in the following description are merely some embodiments of the present invention, and persons of ordinary skill in the art can further derive other drawings according to these drawings without making creative efforts.

DETAILED DESCRIPTION OF ILLUSTRATIVE EMBODIMENTS

To make the objectives, technical solutions, and advantages of embodiments of the present invention clearer, the technical solutions in the embodiments of the present invention are clearly and completely described in the following with reference to the accompanying drawings in the embodiments of the present invention. Apparently, the embodiments in the following description are merely a part of rather than all the embodiments of the present invention. All other embodiments acquired by persons skilled in the art based on the embodiments of the present invention without making creative efforts shall fall within the protection scope of the present invention.

The sequence numbers of the following embodiments of the present invention are only for description, and do not represent the embodiments are good or bad.

Figure 1:
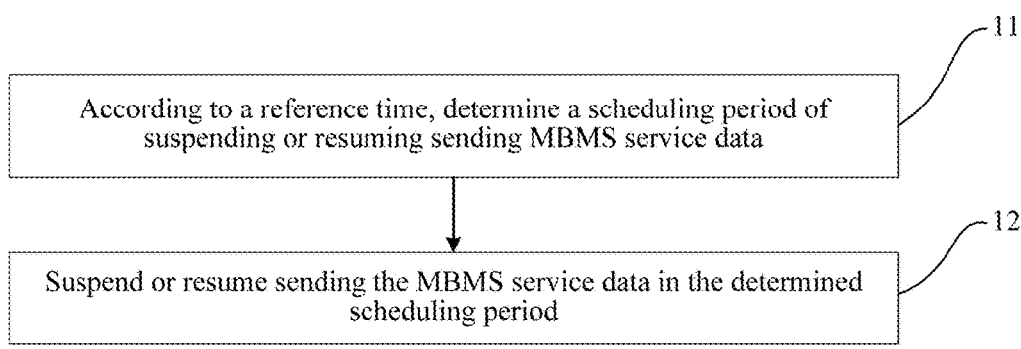
FIG. 1 is a flow chart of a transmission control method for MBMS service data according to a first embodiment of the present invention.

FIG. 1 is a flow chart of a transmission control method for MBMS service data according to a first embodiment of the present invention. The implementation subject of this embodiment may be a base station such as an eNB. As shown in FIG. 1, the transmission control method for MBMS service data according to this embodiment includes:

Step 11: According to a reference time, determine a scheduling period of suspending or resuming sending the MBMS service data.

The base station acquires the reference time before determining the scheduling period of suspending or resuming sending the MBMS service data. The reference time may be directly indicated by a network side device such as an MCE. Or, the reference time may be indirectly indicated by a network side device such as an MCE, for example, the MCE instructs the base station to update an MCCH modification period of an MCCH message, and the base station determines the reference time based on the MCCH modification period. After the base station acquires the reference time, the base station determines a certain scheduling period starting from the reference time and backwards along the time axis, and this scheduling period is taken as the scheduling period of suspending or resuming sending the MBMS service data.

For example, the base station may start from the reference time and search backwards for an Mth scheduling period of a multicast channel (MCH) that bears the MBMS service data, where M is an integer greater than or equal to 1; and determine the found scheduling period as the scheduling period of suspending or resuming the MBMS service data. M may be a certain predetermined value, for example, a communication protocol predetermines M=1; or, M may be a certain preconfigured value, for example, a network management system configures the same M value for each base station in the same multimedia broadcast multicast service single frequency network area (MBSFA) in advance, for example, configures M to 1.

Step 12: Suspend or resume sending the MBMS service data in the determined scheduling period.

In the transmission control method for the MBMS service data according to the embodiment, the base station determines, according to the pre-acquired reference time, the scheduling period of suspending or resuming sending the MBMS service data, and suspends or resumes sending the MBMS service data in the determined scheduling period, so as to realize transmission control of the MBMS service data by the base station. Since each base station in the same MBSFA may adopt the same method provided in the embodiment of the present invention to determine the same scheduling period of suspending or resuming sending the MBMS service data of a certain service, synchronously suspending or resuming sending the MBMS service data of the same service by these base stations can be realized, thereby facilitating reducing interferences in the service.

Figure 2:
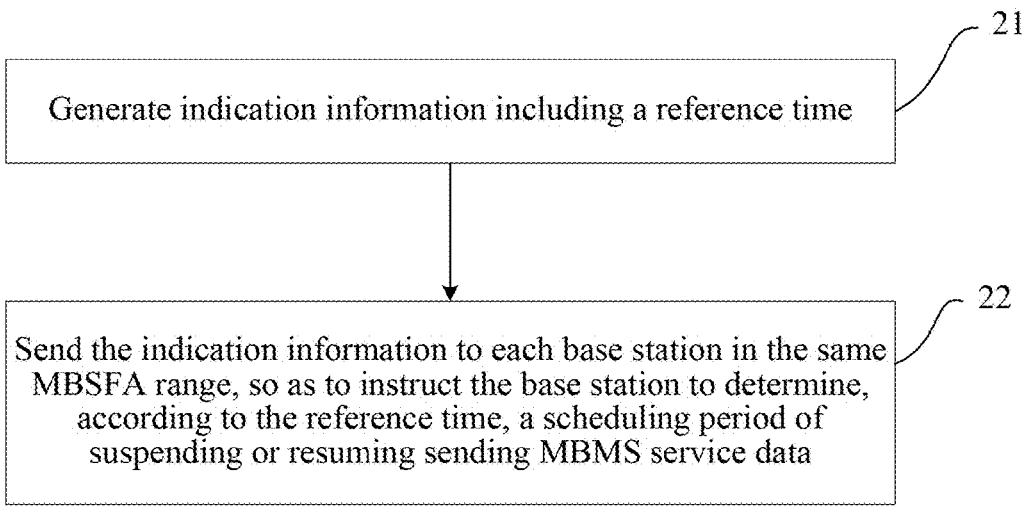
FIG. 2 is a flow chart of a transmission control method for MBMS service data according to a second embodiment of the present invention.

FIG. 2 is a flow chart of a transmission control method for MBMS service data according to a second embodiment of the present invention. The implementation subject of this embodiment may be a network side device relative to a base station, such as an MCE. As shown in FIG. 2, the transmission control method for MBMS service data according to this embodiment includes:

Step 21: Generate indication information including a reference time.

The reference time is used for the base station to determine a scheduling period of suspending or resuming the MBMS service data, which may include, but is not limited to: a start time designated by the network side device; or, an MCCH modification period deviation value N, and N is an integer greater than or equal to 1.

Step 22: Send the indication information to each base station in the same MBSFA range, so as to instruct the base station to determine, according to the reference time, the scheduling period of suspending or resuming sending the MBMS service data.

Each base station in the same MBSFA range receives the indication information sent by the network side device such as the MCE, acquires the reference time included in the indication information, and according to the reference time, determines the scheduling period of suspending or resuming sending the MBMS service data.

For example, the reference time may be the start time designated by the network side device, for example, the start time designated by the MCE or an OAM (Operations, Administration and Maintenance), and then, each base station in the same MBSFA range may determine, according to the start time indicated by the network side device, an Mth scheduling period of the MCH that bears the MBMS service data after the start time indicated by the network side device, as the scheduling period of suspending or resuming sending the MBMS service data, and M is an integer greater than or equal to 1.

For example, the reference time may be an MCCH modification period deviation value N, and N is an integer greater than or equal to 1, and then, each base station in the same MBSFA range may determine, the Mth scheduling period of the multicast channel that bears the multimedia broadcast multicast service data after a start time of an Nth multicast control channel modification period after the multicast control channel modification period of updating the multicast control channel message, as the scheduling period of suspending or resuming sending the multimedia broadcast multicast service data, where M is an integer greater than or equal to 1.

In the transmission control method for MBMS service data according to this embodiment, the network device indicates the reference time for determining the scheduling period of suspending or resuming sending the MBMS service data of a certain service for each base station in the same MBSFA, and therefore, each base station in the same MBSFA may determine, according to the reference time, the same scheduling period of suspending or resuming sending the MBMS service data of this service, and synchronously suspending or resuming sending the MBMS service data of the same service by these base stations is realized, thereby facilitating reducing interferences in the service.

In the following, a transmission principle of the MBMS service data is described in detail with reference to FIG. 3a to FIG. 3e, possible reasons of generating interferences in the service in a LTE system are analyzed, and the technical essence of reducing the interferences in the service by using the technical solutions provided in the embodiments of the present invention is described.

Figure 3A:
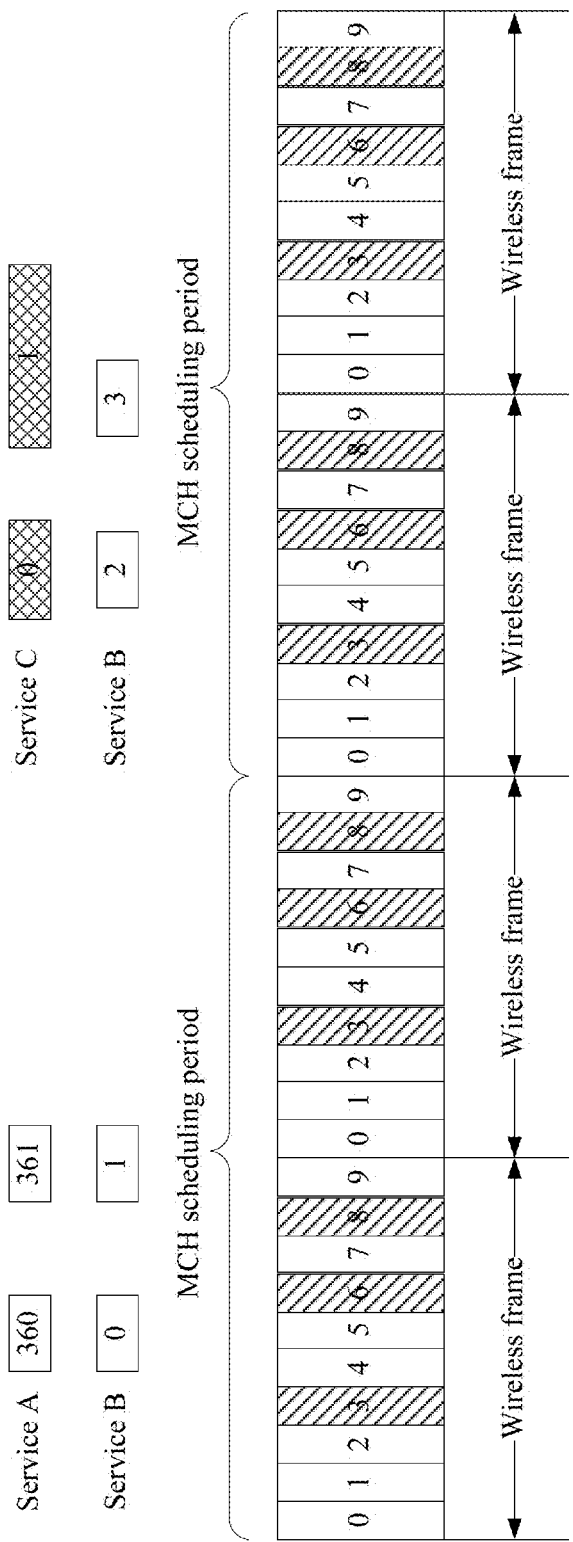
FIG. 3a is a schematic diagram of mapping MBMS service data to MCH scheduling periods according to an embodiment of the present invention.

FIG. 3a is a schematic diagram of mapping MBMS service data to MCH scheduling periods according to an embodiment of the present invention. In order to achieve the purpose of sending by an MBSFN, MCHs of the service bearers may be predetermined, and each scheduling period of each MCH includes one or more sub-frames that can be used for transmitting the MBMS service data, and this type of sub-frame is referred to as an MBSFN sub-frame. In FIG. 3a, three sub-frames are in each wireless frame and are used for MBSFN transmission, and are numbers 3, 6 and 8 sub-frames, that is, the numbers 3, 6 and 8 sub-frames are MBSFN frames. It is assumed that the MCH shown in the FIG. 3a bears the MBMS service data of services A, B and C. The scheduling periods of the MCH are numbered starting from a certain predetermined time according to the time order. The eNB maps each MBMS service data packet to a corresponding scheduling period of the MCH according to a time stamp carried by each MBMS service data packet. For example, in FIG. 3a, number 360 and number 361 MBMS service data packets of the service A and number 0 and number 1 MBMS service data packets of the service B are mapped to an Mth scheduling period of the MCH; number 2 and number 3 MBMS service data packets of the service B and number 0 and number 1 MBMS service data packets of the service C are mapped to an (M+1)th scheduling period of the MCH, where M represents the number of the scheduling period of the MCH, and is an integer greater than or equal to 1.

Figure 3B:
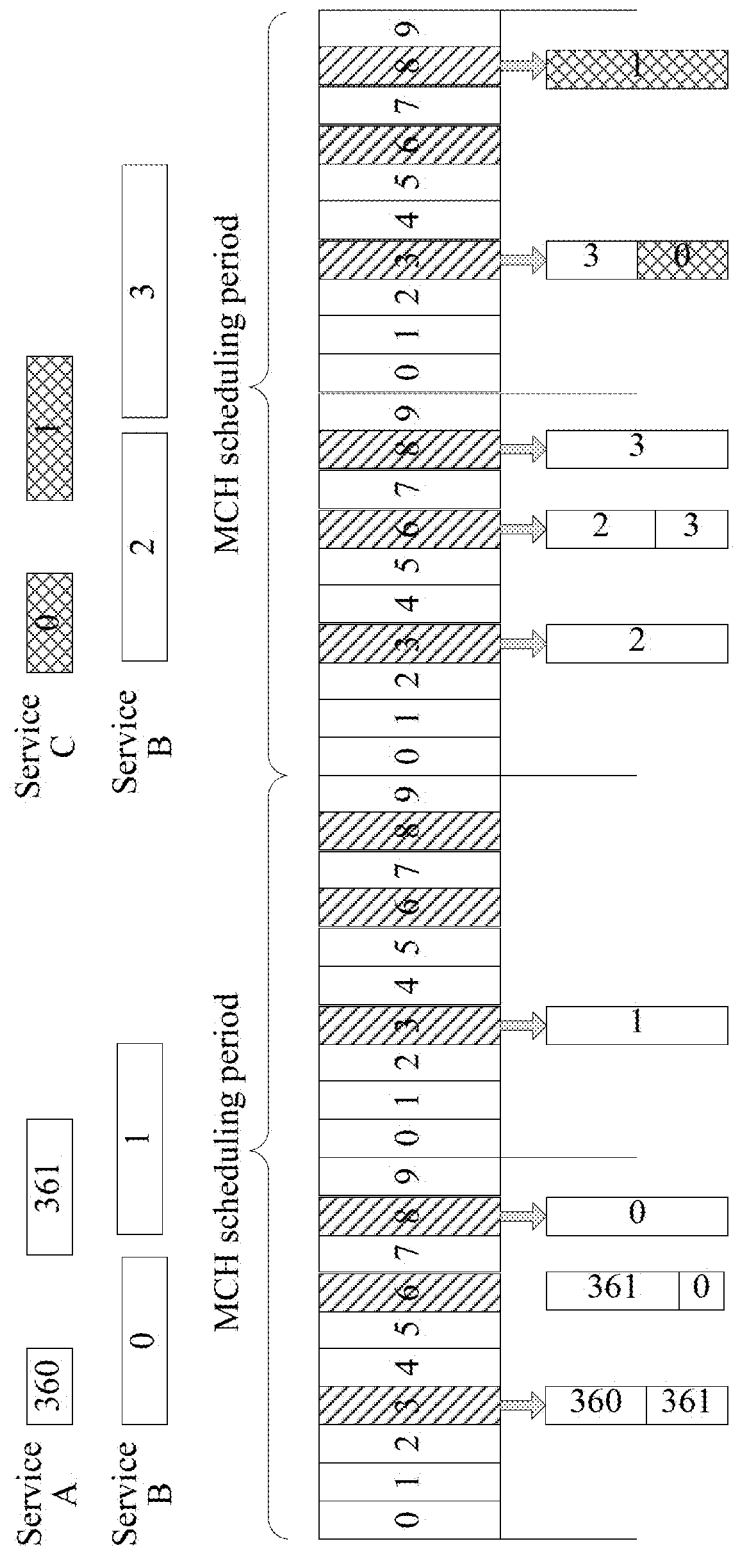
FIG. 3b is a schematic diagram of mapping MBMS service data to MBSFN sub-frames in MCH scheduling periods according to an embodiment of the present invention.

FIG. 3b is a schematic diagram of mapping MBMS service data to MBSFN sub-frames in MCH scheduling periods according to an embodiment of the present invention. In one scheduling period of the MCH, the MBMS service data of each service is sequentially arranged into each MBSFN sub-frame, firstly arranged according to the service, and this service sequence may be determined by the MCE and indicated to the eNB; the MBMS service data of the same service is arranged sequentially. If the service sequence is A, B and C, the specific transmission in the foregoing example is shown in FIG. 3b. Specifically, the number 360 MBMS service data packet of the service A is mapped to the number 3 sub-frame; if the number 3 sub-frame still has a remaining resource, the number 361 MBMS service data packet is continuously mapped to the number 3 sub-frame; and the remaining content after the number 361 MBMS service data packet being mapped to the number 3 sub-frame is mapped to the number 6 sub-frame, and so on. If the MBSFN sub-frame resource included in the current scheduling period of the MCH are exhausted, but the transmission of the MBMS service data packet of a certain number is still not completed, the eNB discards the service data that is not transmitted in the current scheduling period which is of the MCH and is the MBMS service data packet.

In the MBMS system, the MCE may suspend certain services according to actual needs of communication, so as to achieve the purpose of saving an air interface resource and reducing the power consumption of the eNB. For example, the MCE instructs each eNB to make statistics of the quantity of receivers of the MBMS service data of a certain service; if the quantity of the receivers is very few, the MCE may suspend the service. For example, when transmitting the MBMS service data of a service with a higher priority starts, if the MCE finds that the current air interface resource is insufficient, in this case, the MCE may suspend some services with low priorities.

The service suspension is usually temporary, and the suspended services need to be resumed after a period of time. For example, after suspending a certain service for a period of time, the MCE may instruct the eNB to make statistics of the quantity of receivers of the MBMS service data of this service again, and if the quantity of the receivers rises, the MCE may determine to allow the eNB to resume sending the MBMS service data of this service through the air interface. For example, when transmitting the MBMS service data of one or more other services, except the suspended services, ends, and a part of the air interface resource is empty, the MCE may instruct the eNB to resume sending the MBMS service data of the service.

Figure 3C:
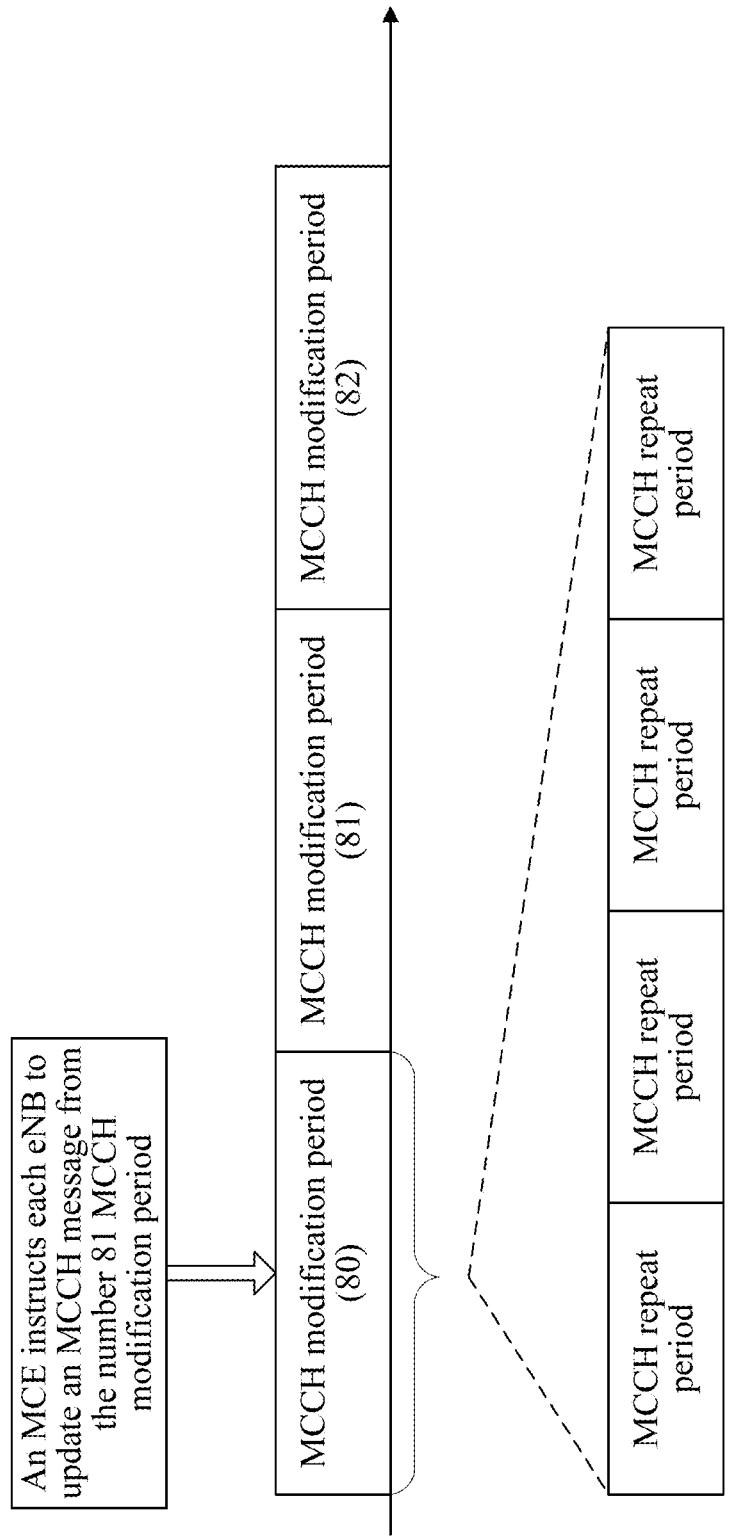
FIG. 3c is a schematic diagram of an MCCH modification period when an MCCH message is updated according to an embodiment of the present invention.

Since a terminal determines, according to a control signaling of the MBMS service, that is, an MCCH message, to receive the MBMS service data, the service information indicated by the MCCH message should correspond to the MBMS service data that is actually sent. When the MCE determines to suspend or resume sending the MBMS service data of a certain service, based on the current updating mechanism of the MCCH message, it is ensured that each eNB synchronously updates the MCCH messages. Specifically, the MCCH message is sent cyclically, the MCE can only update the MCCH message at some predefined time points, and a time interval between two time points when the MCCH message is possibly updated is referred to as an MCCH modification period. Each MCCH modification period may include multiple MCCH repeat periods, as shown in FIG. 3c, each MCCH modification period may include four MCCH repeat periods. The eNB sends an MCCH message in each of the four MCCH repeat periods, and the contents of the MCCH messages sent in the four MCCH repeat periods are the same; the eNB can merely modify the content of the MCCH message, that is, update the MCCH message, at a start time of a next MCCH modification period. Each MCCH modification period in the LTE is numbered, and each eNB in the MBSFN numbers the MCCH modification period all at the same start point, so that at the same moment, each eNB in the same MBSFA range uses the same MCCH modification period number. When the MCE determines that a certain service needs to be suspended or resumed in a certain MBSFA, the MCE firstly instructs all the eNBs in the MBSFA to update the MCCH message from a certain MCCH modification period. All the eNBs in the same MBSFA range update the MCCH message in the same MCCH modification period, so as to ensure that the service information indicated in the MCCH message is consistent with the MBMS data that is actually transmitted by the air interface.

Figure 3D:
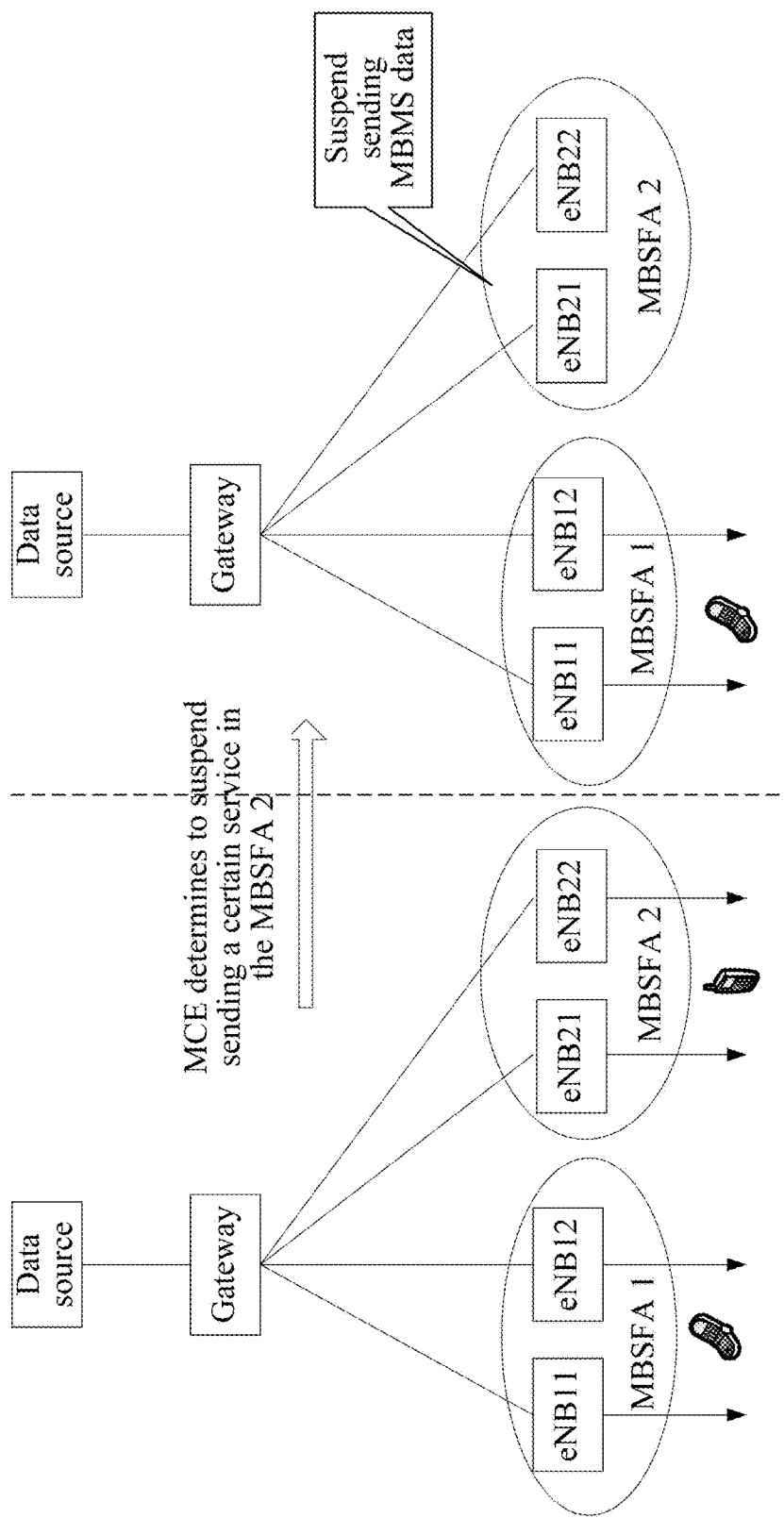
FIG. 3d is a scenario example of suspending sending MBMS service data according to an embodiment of the present invention.

Although each eNB in the same MBSFA synchronously updates the MCCH message in the same MCCH modification period, the prior art does not have a unified method used for determining the time of transmission control for the corresponding MBMS service data, so that the eNB usually randomly determines the time of transmission control for the corresponding MBMS service data, and as a result, interferences in the service may be caused. The details are described with examples as follows:

FIG. 3d is a scenario example of suspending sending MBMS service data according to an application scenario according to an embodiment of the present invention. It is assumed that the MCE determines to suspend a service A in the MBSFA 2 range, and then the MCE indicates all the eNBs, such as eNB 21 and eNB 22, in the MBSFA 2 range. Specifically, as shown in FIG. 3d, the MCE instructs all the eNBs, such as eNB 21 and eNB 22, in the MBSFA 2 range to start updating the MCCH message at the start time of the number 81 MCCH modification period: delete corresponding control information of the service A from the original MCCH message. The eNB 21 and eNB 22 synchronously update the MCCH message, but may start suspending sending data packets of the service A in different scheduling periods.

Figure 3E:
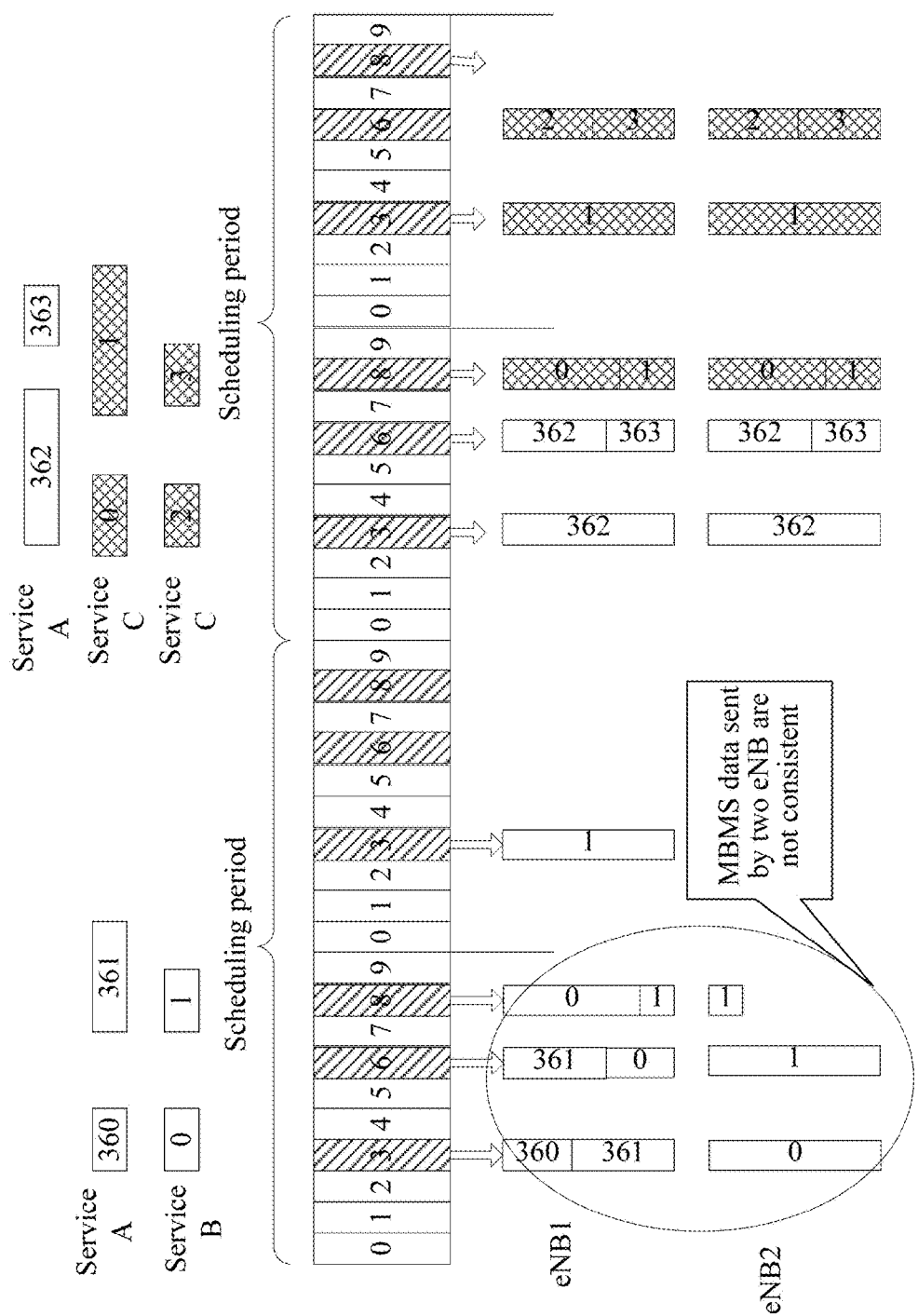
FIG. 3e is a scenario example of bringing in interferences in resuming sending MBMS service data according to an embodiment of the present invention.

FIG. 3e is a scenario example of bringing in interferences by resuming sending MBMS service data according to an application scenario of an embodiment of the present invention. If the MCE determines to resume the service A in the MBSFA 2 range, the MCE instructs all the eNBs, such as the eNB 21 and eNB 22, in the MBSFA 2 range to start updating the MCCH message at the start time of the MCCH modification period with the same number. The eNB 21 and eNB 22 synchronously update the MCCH message, but may start resuming sending the MBMS service data of the service in different scheduling periods. For example, if the eNB 21 randomly determines to resume sending the data packet of the service A in an Mth scheduling period of the MCH, the MBMS service data sent by the eNB 21 in the Mth scheduling period of the MCH is that: the number 360 and number 361 data packets of the service A, and the number 0 and number 1 data packets of the service B; if the eNB 22 randomly determines to resume sending the MBMS data of the service in an (M+1)th scheduling period of the MCH, the MBMS data sent by the eNB 22 in the (M+1)th scheduling period of the MCH is that: the number 0 and number 1 data packets of the service B. It can be seen that, in the Mth scheduling period of the MCH, the data packets sent by the eNB 21 and the eNB 22 through the air interface are different. Since the MBSFN transmission mode must ensure that all the eNB in the same MBSFA range transmit the same content, and the eNB 21 and the eNB 22 send different MBMS service data on the air interface, interferences in the services are caused. Similarly, when the MBMS service is suspended, when different eNBs in the same MBSFA range start suspending sending the MBMS service data of the service in different scheduling periods, each eNB is caused to send different contents on the air interface in the same scheduling period, and interferences in the service may also be caused.

In the transmission control method for the MBMS data provided in this embodiment, according to the pre-acquired reference time, the eNB determines the time of the transmission control for the MBMS service data. Each eNB in the same MBSFA range uses the same method, and the determined time of the transmission control for the MBMS service data is the same, so that each eNB in the same MBSFA range can synchronously suspend or resume sending the same MBMS service data, thereby reducing interferences in the service.

Figure 4:
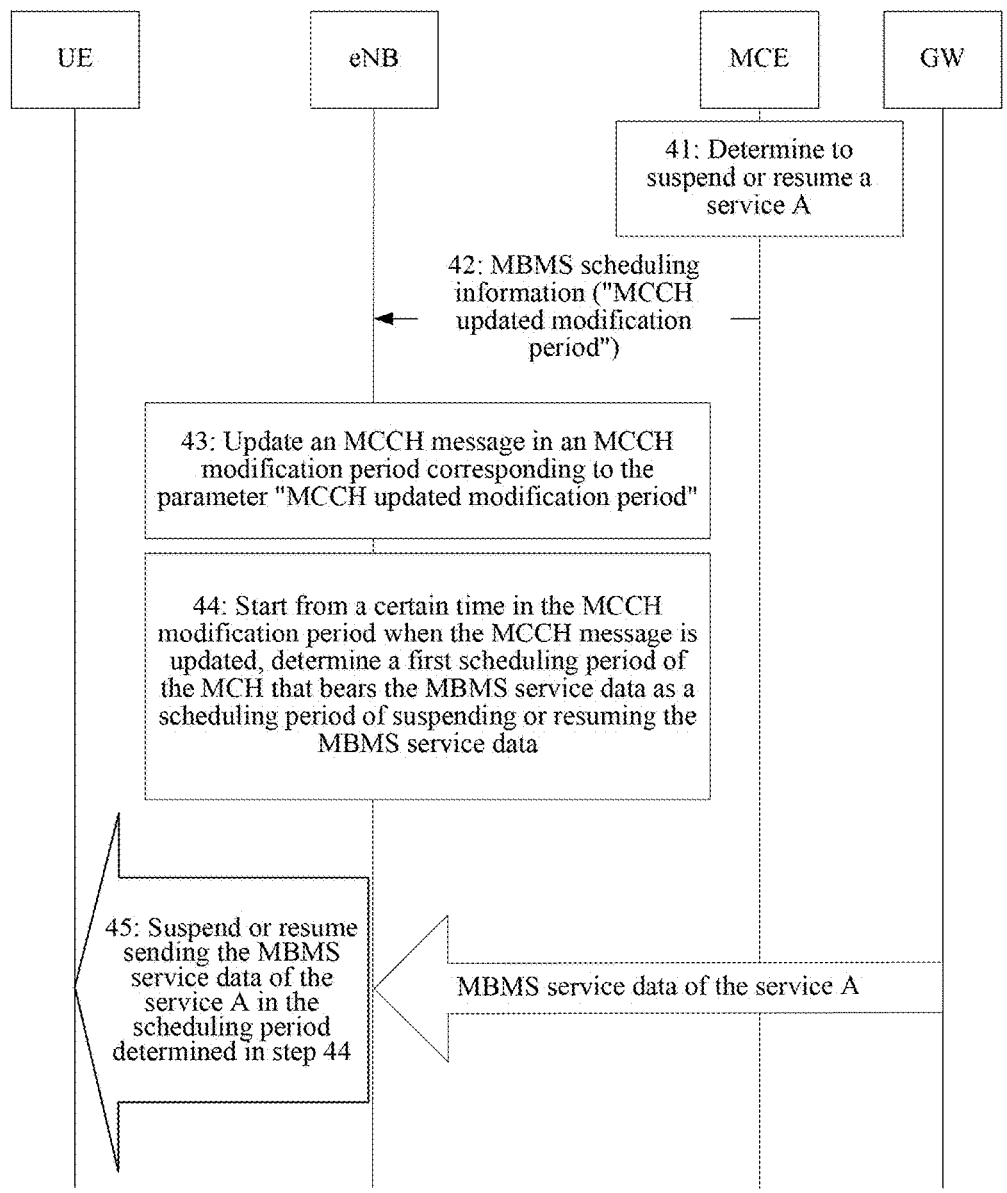
FIG. 4 is a signaling interaction diagram of a transmission control method for MBMS service data according to a third embodiment of the present invention.

FIG. 4 is a signaling interaction diagram of a transmission control method for MBMS service data according to a third embodiment of the present invention. A reference time in this embodiment is: a certain time of an MCCH modification period when an MCCH message is updated. As shown in FIG. 4, the method according to this embodiment includes:

Step 41: An MCE determines to suspend or resume the service A, and generates MBMS scheduling information.

If the MCE determines to suspend a service A, the MCE deletes a control signaling of the service A from the MCCH message, so as to update the MCCH message; if the MCE determines to resume the suspended service A, a control signaling of the service A is added into the MCCH message, so as to update the MCCH message.

The MCCH scheduling information includes: a parameter "an MCCH updated modification period", used to indicate the MCCH modification period when the MCCH message is updated; and the MCCH message includes a control signaling corresponding to the MBMS service data, such as information of suspending or resuming the MBMS service.

Step 42: The MCE sends the MBMS scheduling information to an eNB, where the MBMS scheduling information includes the parameter "MCCH updated modification period".

Step 43: The eNB receives the MBMS scheduling information, and updates the MCCH message in the MCCH modification period corresponding to the parameter "MCCH updated modification period" that is included in the MBMS scheduling information.

The eNB receives an MCCH message in the MCCH modification period corresponding to the parameter "MCCH updated modification period", and compares the newly received MCCH message with an MCCH message stored by the eNB (referred to as: original MCCH message). If the newly received MCCH message is in lack of the control signaling of the service A relative to the original MCCH message, the eNB learns that the MCE suspends the service A; and if the newly received MCCH message is added with the control signaling of the service A relative to the original MCCH message, the eNB learns that the MCE resumes the service A.

Step 44: The eNB determines, from a certain time of the MCCH modification period when the MCCH message is updated, a first scheduling period of the MCH that bears the MBMS service data, as a scheduling period of suspending or resuming the MBMS service data.

In the LTE system, a corresponding relationship between the service and the MCH is determined in advance, a certain service such as the MBMS data of the service A can merely be transmitted on the MCH corresponding to the service A. In the following, with reference to FIG. 5 to FIG. 8, from different times of the MCCH modification period when the MCCH message is updated optional, implementation manners of the eNB for determining the scheduling period of starting suspending or resuming the corresponding MBMS service data are described in detail. For the ease of description, merely three MCHs, that is, an MCH 1, an MCH 2, and an MCH 3, are used as examples in FIG. 5 to FIG. 7 for description; and the examples should not be construed as a limitation to the essence of the technical solutions of the present invention.

Implementation manner 1: From a start time of the MCCH modification period when the MCCH message is updated, search backwards for a first scheduling period of the MCH that bears the MBMS service data; and determine the found scheduling period as the scheduling period of suspending or resuming the MBMS service data; and the details are shown in FIG. 5.

Figure 5:
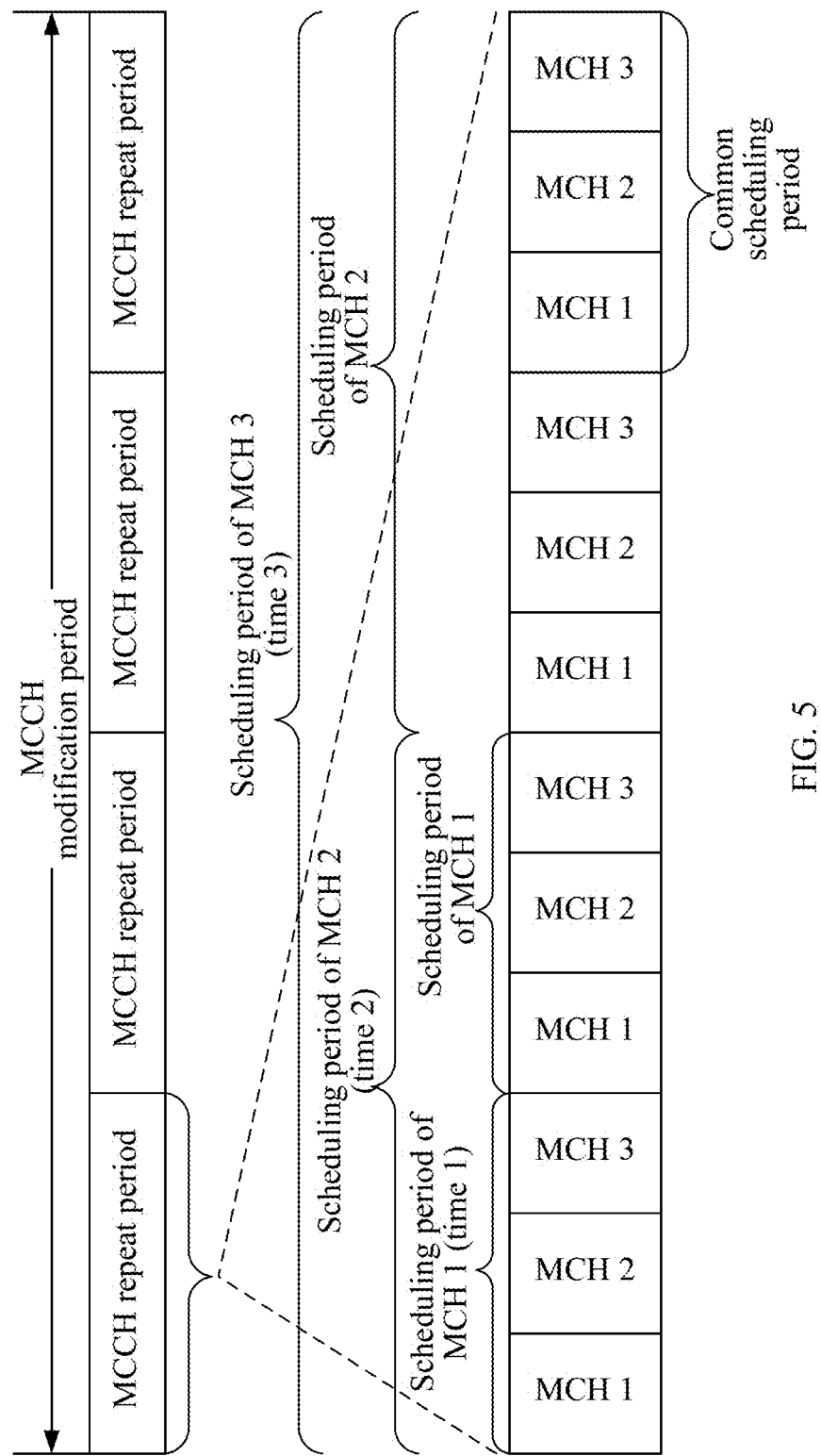
FIG. 5 is a first optional implementation manner example of determining a time of transmission control of MBMS service data according to a third embodiment of the present invention.

If the MCH that bears the MBMS service data of the service A is predetermined to be the MCH 1, the eNB, from a start time of the MCCH modification period when the MCCH message is updated, searches backwards for a first scheduling period of the MCH 1, that is, corresponding to a time 1 shown in FIG. 5; and determines the found first scheduling period of the MCH 1 as the scheduling period of suspending or resuming sending the MBMS service data of the service A.

If the MCH that bears the MBMS service data of the service A is predetermined to be the MCH 2, the eNB, from a start time of the MCCH modification period when the MCCH message is updated, searches backwards for a first scheduling period of the MCH 2, that is, corresponding to a time 2 shown in FIG. 5; and determines the found first scheduling period of the MCH 2 as the scheduling period of suspending or resuming sending the MBMS service data of the service A.

If the MCH that bears the MBMS service data of the service A is predetermined to be the MCH 3, the eNB, from a start time of the MCCH modification period when the MCCH message is updated, searches backwards for a first scheduling period of the MCH 3, that is, corresponding to a time 3 shown in FIG. 5; and determines the found first scheduling period of the MCH 3 as the scheduling period of suspending or resuming sending the MBMS service data of the service A.

Implementation manner 2: From a start time of transmitting the MCCH message for the first time in the MCCH modification period when the MCCH message is updated, search backwards for the first scheduling period of the MCH that bears the MBMS service data; and determine the found scheduling period as the scheduling period of suspending or resuming the MBMS service data.

Each MCCH modification period may include four MCCH repeat periods, and the contents of the MCCH messages transmitted in different MCCH repeat periods are the same. The MCCH message may be sent in the first or not the first MBSFN sub-frame of each MCCH repeat period. Each MCCH repeat period may include four common periods, and each common period includes a resource block of the MCH 1, the MCH 2, and the MCH 3.

Figure 6:
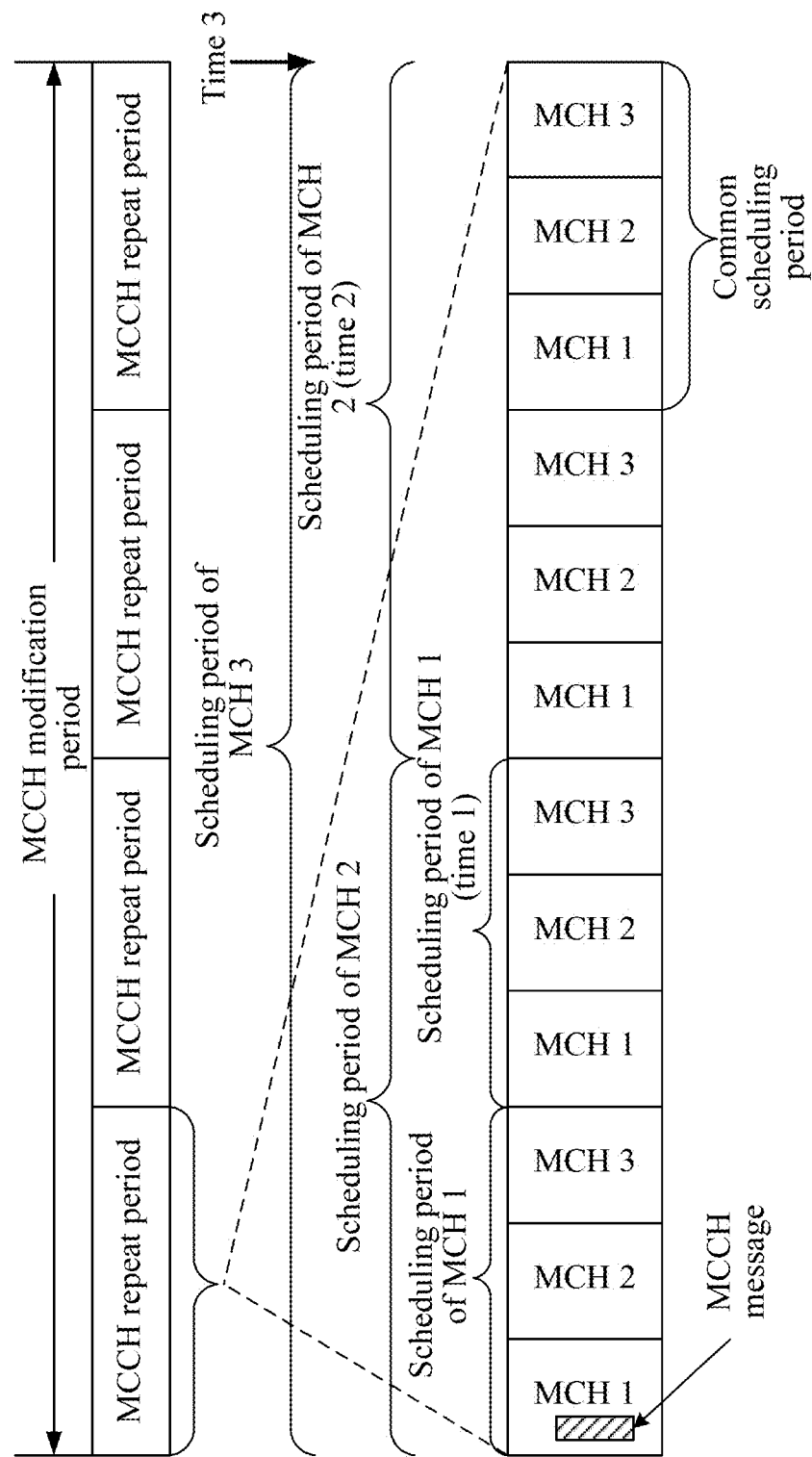
FIG. 6 is a second optional implementation manner example of determining a time of transmission control of MBMS service data according to a third embodiment of the present invention.

If the MCH that bears the MBMS service data of the service A is predetermined to be the MCH 1, the eNB, from a time of transmitting the MCCH message in a first repeat period of the MCCH modification period when the MCCH message is updated, searches backwards for a first scheduling period of the MCH 1, that is, corresponding to a time 1 shown in FIG. 6; and determines the found first scheduling period of the MCH 1 as the scheduling period of suspending or resuming sending the MBMS service data of the service A.

If the MCH that bears the MBMS service data of the service A is predetermined to be the MCH 2, the eNB, from a time of transmitting the MCCH message in a first repeat period of the MCCH modification period when the MCCH message is updated, searches backwards for a first scheduling period of the MCH 2, that is, corresponding to a time 2 shown in FIG. 6; and determines the found first scheduling period of the MCH 2 as the scheduling period of suspending or resuming sending the MBMS service data of the service A.

If the MCH that bears the MBMS service data of the service A is predetermined to be the MCH 3, the eNB, from a time of transmitting the MCCH message in a first repeat period of the MCCH modification period when the MCCH message is updated, searches backwards for a first scheduling period of the MCH 3, that is, corresponding to a time 3 in FIG. 6; and determines the found first scheduling period of the MCH 3 as the scheduling period of suspending or resuming sending the MBMS service data of the service A.

Implementation manner 3: From a start time of a second MCCH repeat period in the MCCH modification period when the MCCH message is updated, search backwards for a first scheduling period of the MCH that bears the MBMS service data; and determine the found scheduling period as the scheduling period of suspending or resuming the MBMS service data.

Each MCCH modification period may include four MCCH repeat periods, and the contents of the MCCH messages transmitted in different MCCH repeat periods are the same.

Figure 7:
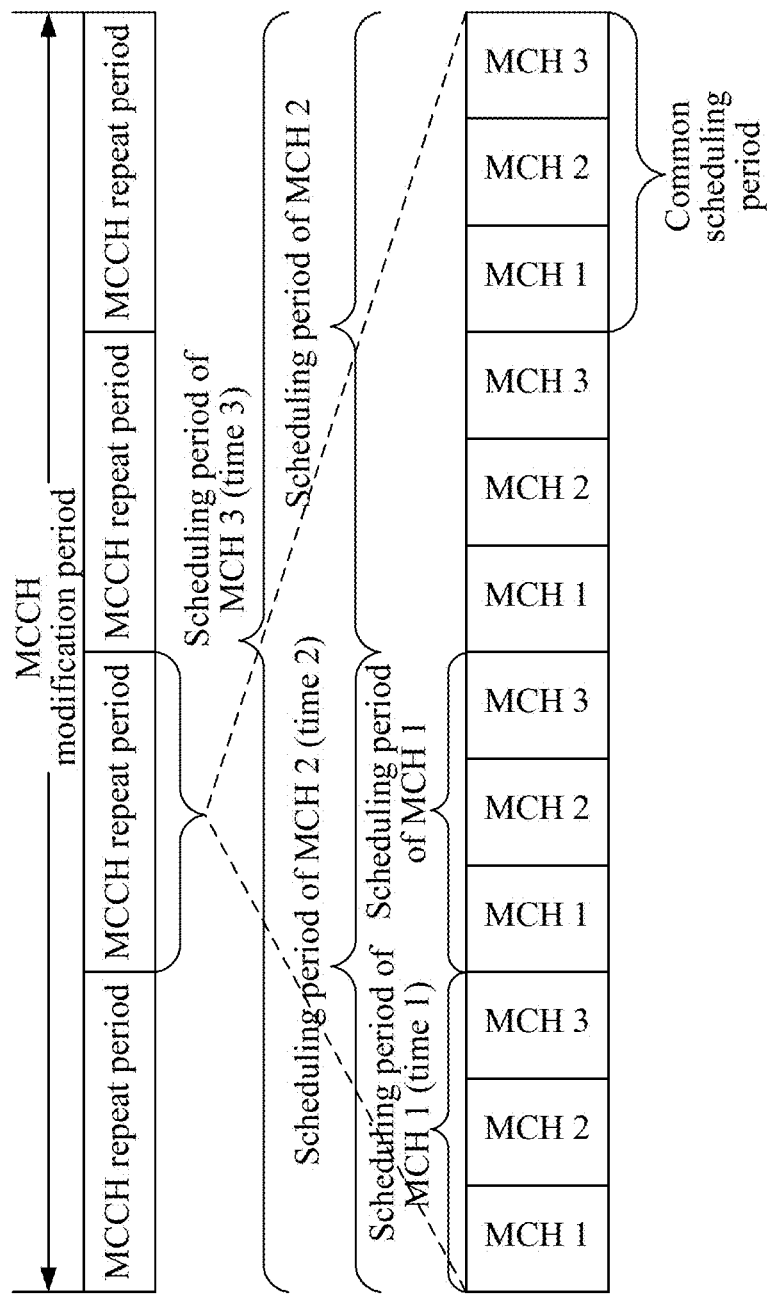
FIG. 7 is a third optional implementation manner example of determining a time of transmission control of MBMS service data according to a third embodiment of the present invention.

If the MCH that supports and bears the MBMS service data of the service A is predetermined to be the MCH 1, the eNB, from a start time of the second repeat period in the MCCH modification period when the MCCH message is updated, searches backwards for a first scheduling period of the MCH 1, that is, corresponding to a time 1 shown in FIG. 7; and determines the found first scheduling period of the MCH 1 as the scheduling period of suspending or resuming sending the MBMS service data of the service A.

If the MCH that bears the MBMS service data of the service A is predetermined to be the MCH 2, the eNB, from a start time of the second repeat period in the MCCH modification period when the MCCH message is updated, searches backwards for a first scheduling period of the MCH 2, that is, corresponding to a time 2 shown in FIG. 7; and determines the found first scheduling period of the MCH 2 as the scheduling period of suspending or resuming sending the MBMS service data of the service A.

If the MCH that bears the MBMS service data of the service A is predetermined to be the MCH 3, the eNB, from a start time of the second repeat period in the MCCH modification period when the MCCH message is updated, searches backwards for a first scheduling period of the MCH 3, that is, corresponding to a time 3 shown in FIG. 7; and determines the found first scheduling period of the MCH 3 as the scheduling period of suspending or resuming sending the MBMS service data of the service A.

Step 45: The eNB suspends or resumes sending the MBMS service data of the service A in the scheduling period that is determined in step 44.

No matter whether the eNB suspends or resumes sending the MBMS service data of the service A to the UE in the scheduling period that is determined in step 44, a data source continues to deliver the MBMS service data of the service A through a gateway (GW). When the eNB suspends sending the MBMS service data of a certain service such as the service A, the eNB may exit an IP multicast group, and join the corresponding IP multicast group again when the MCE instructs resuming the service A. In this way, the eNB does not receive the data packets of the MBMS service in the suspended period of this MBMS service. Or, the eNB may not exit the IP multicast group, in this way, the eNB does not need to join the IP multicast group again when the MCE instructs resuming the service A. If this method is adopted, the eNB continues receiving the MBMS data of the service A in the suspended period of the service A, and eNB merely needs to discard the received MBMS data of the service A.

In this embodiment, each eNB in the same MBSFA determines, according to the certain same time of the MCCH modification period when the MCCH message is updated, the same scheduling period of starting the transmission control of the MBMS service data, and suspends or resumes sending the MBMS service data of the same service in the determined scheduling period, and therefore, it is realized that the eNB synchronously suspends or resumes sending the MBMS service data of the same service, thereby reducing interferences in the service.

Figure 8:
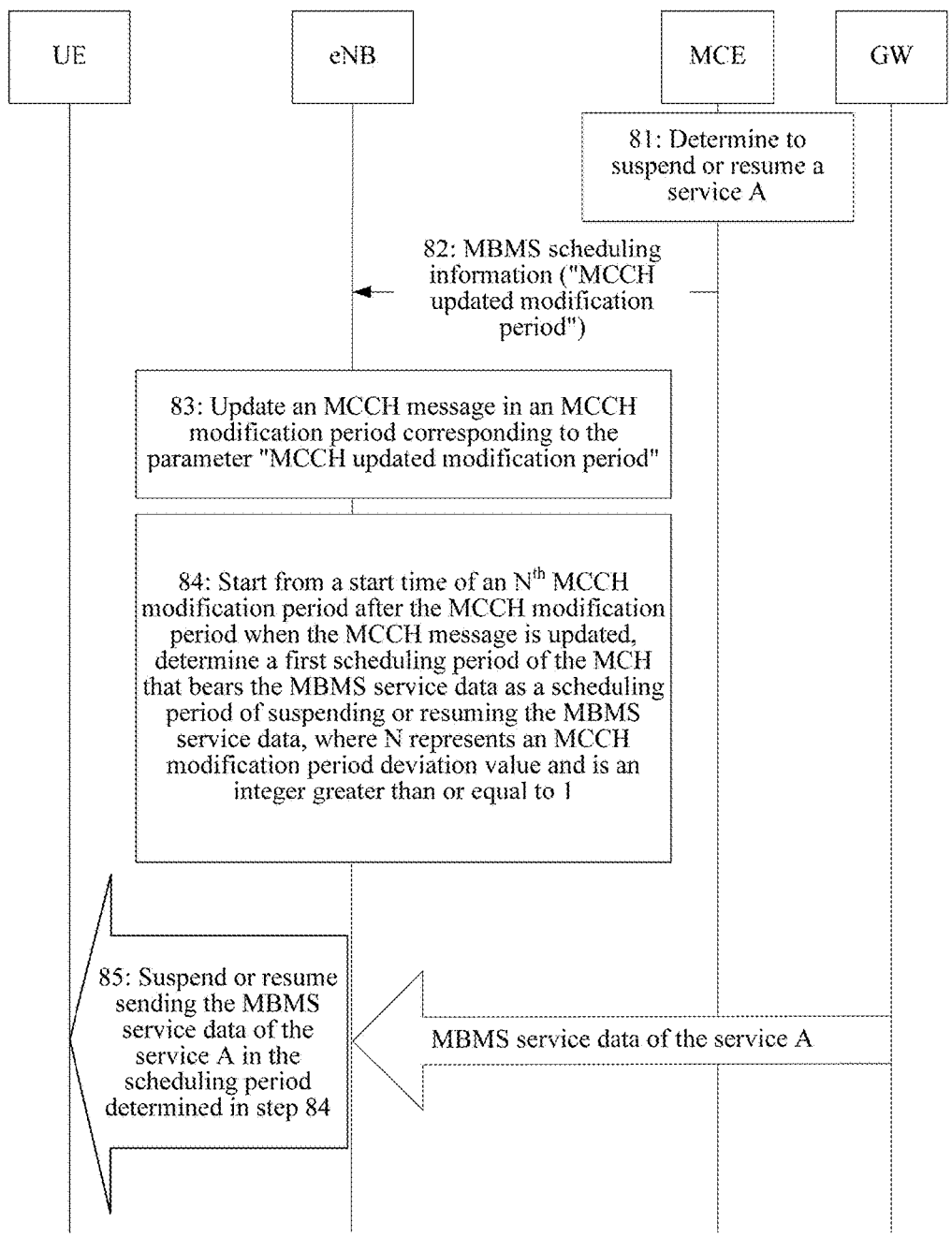
FIG. 8 is a signaling interaction diagram of a transmission control method for MBMS service data according to a fourth embodiment of the present invention.

FIG. 8 is a signaling interaction diagram of a transmission control method for MBMS service data according to a fourth embodiment of the present invention. A reference time in this embodiment is: a start time of an Nth MCCH modification period after an MCCH modification period when an MCCH message is updated, where N represents an MCCH modification period deviation value and is an integer greater than or equal to 1. As shown in FIG. 8, the method according to this embodiment includes:

Step 81: An MCE determines to suspend or resume the service A, and generates MBMS scheduling information.

Step 82: The MCE sends the MBMS scheduling information to an eNB, where the MBMS scheduling information includes a parameter "MCCH updated modification period".

Step 83: The eNB receives the MBMS scheduling information, and updates the MCCH message in the MCCH modification period corresponding to the parameter "MCCH updated modification period" that is included in the MBMS scheduling information.

Step 84: The eNB, from a start time of an Nth MCCH modification after the MCCH modification period when the MCCH message is updated, determines, a first scheduling period of the MCH that bears the MBMS service data, as a scheduling period of suspending or resuming the MBMS service data, where N represents the MCCH modification period deviation value and is an integer greater than or equal to 1.

The eNB pre-acquires the MCCH modification period deviation value N when determining the scheduling period of starting suspending or resuming the MBMS service data. The scheduling period deviation value N configured by each eNB in the same MBSFA range is the same.

Optionally, the MCCH modification period deviation value N may be preconfigured on the eNB. Or, the MCCH modification period deviation value N may be indicated to the eNB by a network side device such as the MCE, and the specific manner of the network side device such as the MCE indicating the MCCH modification period deviation value N to the eNB is not limited, for example, the MCCH modification period deviation value N may be carried in the MBMS scheduling information described in the foregoing step 82 and is indicated to the eNB; or, the MCCH modification period deviation value N may be carried in other M2 interface messages between the MCE and the eNB, except the MBMS scheduling information, such as an initial configuration message and an MBMS service start/end/update message.

Figure 9:
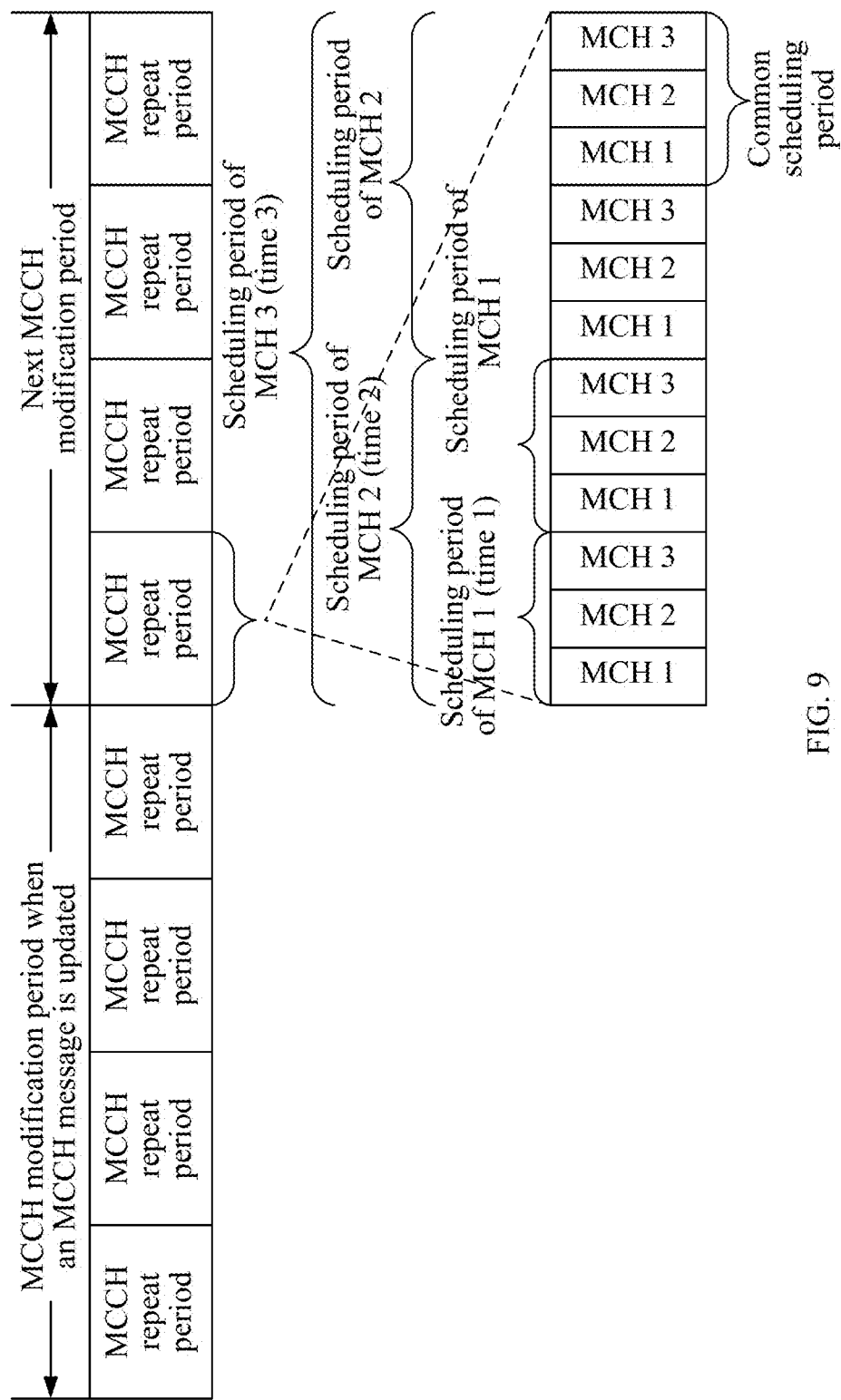
FIG. 9 is an optional implementation manner example of determining a time of transmission control of MBMS service data according to a fourth embodiment of the present invention.

N=1 is taken as an example for description:

If the MCH that bears the MBMS service data of the service A is predetermined to be the MCH 1, the eNB, from a start time of a first MCCH modification period after the MCCH modification period when the MCCH message is updated, searches backwards for a first scheduling period of the MCH 1, that is, corresponding to a time 1 shown in FIG. 9; and determines the found first scheduling period of the MCH 1 as the scheduling period of suspending or resuming the MBMS service data of the service A.

If the MCH that bears the MBMS service data of the service A is predetermined to be the MCH 2, the eNB, from a start time of the first MCCH modification period after the MCCH modification period when the MCCH message is updated, searches backwards for a first scheduling period of the MCH 2, that is, corresponding to a time 2 shown in FIG. 9; and determines the found first scheduling period of the MCH 2 as the scheduling period of suspending or resuming the MBMS service data of the service A.

If the MCH that bears the MBMS service data of the service A is predetermined to be the MCH 3, the eNB, from a start time of the first MCCH modification period after the MCCH modification period when the MCCH message is updated, searches backwards for a first scheduling period of the MCH 3, that is, corresponding to a time 3 shown in FIG. 9; and determines the found first scheduling period of the MCH 3 as the scheduling period of suspending or resuming the MBMS service data of the service A.

The implementation manner when the MCCH modification period deviation value N is an integer greater than or equal to 2 is similar to the foregoing technical solutions when N=1, which is not repeatedly described here again.

Step 85: The eNB suspends or resumes sending the MBMS service data of the service A in the scheduling period that is determined in step 84.

In this embodiment, each eNB in the same MBSFA uses the same reference time to determine the same scheduling period of starting the transmission control of the MBMS service data, and suspends or resumes sending the MBMS service data of the same service in the determined scheduling period, so that it can be realized that the eNB synchronously suspends or resumes sending the MBMS service data of the same service, thereby reducing interferences in the service.

Figure 10:
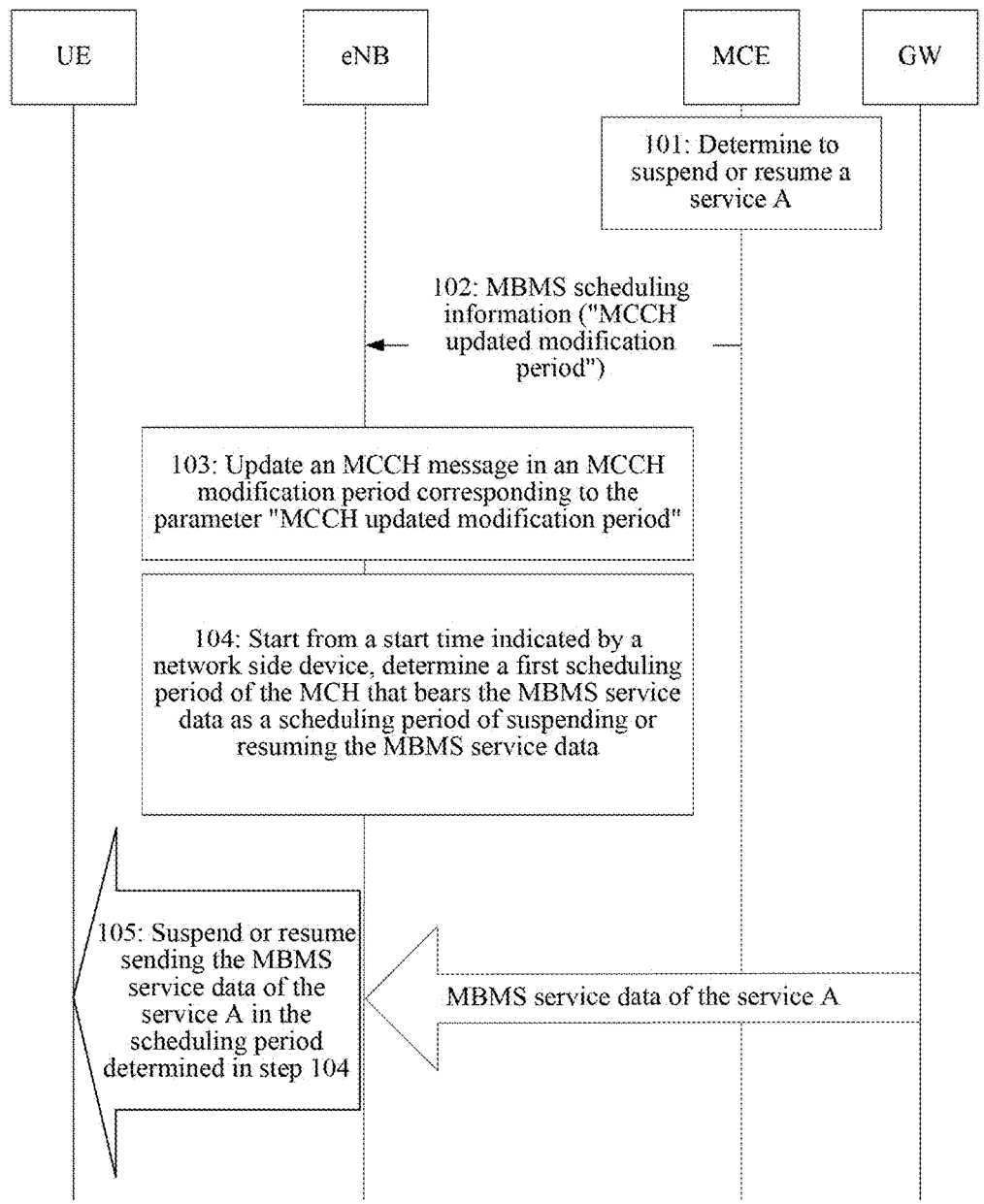
FIG. 10 is a signaling interaction diagram of a transmission control method for MBMS service data according to a fifth embodiment of the present invention.

FIG. 10 is a signaling interaction diagram of a transmission control method for MBMS service data according to a fifth embodiment of the present invention. A reference time in this embodiment is: a start time indicated by a network side device. As shown in FIG. 10, the method according to this embodiment includes:

Step 101: An MCE determines to suspend or resume a service A, and generates MBMS scheduling information.

Step 102: The MCE sends the MBMS scheduling information to an eNB, where the MBMS scheduling information includes a parameter "MCCH updated modification period".

Step 103: The eNB receives the MBMS scheduling information, and updates an MCCH message in an MCCH modification period corresponding to the parameter "MCCH updated modification period" that is included in the MBMS scheduling information.

Step 104: The eNB determines, from the start time indicated by the network side device, a first scheduling period of the MCH that bears the MBMS service data, as a scheduling period of suspending or resuming the MBMS service data.

Optionally, before determining the scheduling period of starting suspending or resuming the MBMS service data, the eNB may receive indication information including the reference time, where the reference time may include the start time indicated by the network side device, such as the start time indicated by the MCE. According to the start time indicated by the network side device, such as the start time indicated by the MCE, the eNB determines the scheduling period of suspending or resuming the MBMS service data. The start time which is indicated by the network side device, such as the MCE, and is acquired by each eNB in the same MBSFA range is the same.

The start time indicated by the network side device, such as the MCE, may be carried in the MBMS scheduling information described in the foregoing step 102 and is indicated to the eNB; or, the start time indicated by the network side device, such as the MCE, may be carried in other M2 interface messages between the MCE and the eNB, except the MBMS scheduling information, such as an initial configuration message and an MBMS service start/end/update message.

Step 105: The eNB suspends or resumes sending the MBMS service data of the service A in the scheduling period that is determined in step 104.

In this embodiment, each eNB in the same MBSFA, according to the start time indicated by the network side device, determines the same scheduling period of starting the transmission control of the MBMS service data, and suspends or resumes sending the MBMS service data of the same service in the determined scheduling period, so that it can be realized that the eNB synchronously suspends or resumes sending the MBMS service data of the same service, thereby reducing interferences in the service.

Figure 11:
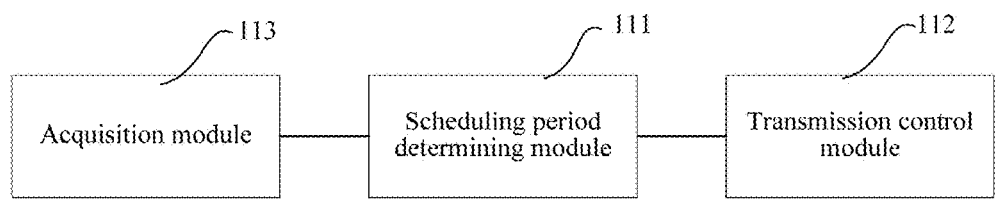
FIG. 11 is a schematic structural diagram of a base station according to a sixth embodiment of the present invention.

FIG. 11 is a schematic structural diagram of a base station according to a sixth embodiment of the present invention. The base station shown in FIG. 11 includes: a scheduling period determining module in and a transmission control module 112.

The scheduling period determining module 111 may be configured to: according to a reference time, determine a scheduling period of suspending or resuming sending MBMS service data.

The transmission control module 112 may be configured to suspend or resume sending the MBMS service data in the determined scheduling period.

Based on the foregoing technical solutions, optionally, the scheduling period determining module 111 may be further configured to: according to the reference time, determine, an Mth scheduling period of a multicast channel that bears the multimedia broadcast multicast service data after the reference time, as the scheduling period of suspending or resuming sending the multimedia broadcast multicast service data; and M is an integer greater than or equal to 1.

Optionally, the reference time may include: a start time of the MCCH modification period when the MCCH message is updated. In this case, the scheduling period determining module 111 may be further configured to determine, from the start time of the MCCH modification period when the MCCH message is updated, the Mth scheduling period of the MCH that bears the MBMS service data, as the scheduling period of suspending or resuming the MBMS service data. The MCCH message includes a control signaling corresponding to the MBMS service data.

Optionally, the reference time may include: a start time of transmitting the MCCH message for the first time in the MCCH modification period when the MCCH message is updated. In this case, the scheduling period determining module 111 may be further configured to determine, from the start time of transmitting the MCCH message for the first time in the MCCH modification period when the MCCH message is updated, the Mth scheduling period of the MCH that bears the MBMS service data, as the scheduling period of suspending or resuming the MBMS service data.

Optionally, the reference time may include: a start time of a second MCCH repeat period in the MCCH modification period when the MCCH message is updated. In this case, the scheduling period determining module 111 may be further configured to determine, from the start time of the second MCCH repeat period in the MCCH modification period when the MCCH message is updated, the Mth scheduling period of the MCH that bears the MBMS service data, as the scheduling period of suspending or resuming the MBMS service data.

Optionally, the reference time may include: a start time of an Nth MCCH modification period after the MCCH modification period when the MCCH message is updated, where N represents an MCCH modification period deviation value and is an integer greater than or equal to 1. In this case, the scheduling period determining module 111 may be further configured to determine, from the start time of the Nth MCCH modification period after the MCCH modification period when the MCCH message is updated, the Mth scheduling period of the MCH that bears the MBMS service data, as the scheduling period of suspending or resuming the MBMS service data. Further, the base station may also include: an acquisition module 113. The acquisition module 113 may be configured to preconfigure the MCCH modification period deviation value; or, to acquire the MCCH modification period deviation value according to received indication information including the MCCH modification period deviation value.

Optionally, the reference time may include: a start time indicated by the network side device, such as a start time indicated by the MCE. In this case, the base station may further include: an acquisition module 113. The acquisition module is configured to receive indication information including the reference time; and the reference time includes the start time indicated by the network side device. The scheduling period determining module 111 may be further configured to determine, from the start time indicated by the network side device, such as the MCE, the Mth scheduling period of the MCH that bears the MBMS service data, as the scheduling period of suspending or resuming the MBMS service data; and M is an integer greater than or equal to 1.

According to the pre-acquired reference time, the base station provided in this embodiment may determine the scheduling period of suspending or resuming sending the MBMS service data, and suspends or resumes sending the MBMS service data in the determined scheduling period, so as to realize transmission control of the MBMS service data by the base station. Since each base station in the same MBSFA may use the same method provided in the embodiment of the present invention to determine the same scheduling period of starting suspending or resuming sending the MBMS service data of a certain service, so that it can be realized that these base stations synchronously suspend or resume sending the MBMS service data of the same service, thereby facilitating reducing interferences in the service. As for the working principle of the base station provided in this embodiment, reference can be made to the corresponding records of the corresponding embodiments in FIG. 1 and FIG. 4 to FIG. 10, which is not repeatedly described here again.

Figure 12:
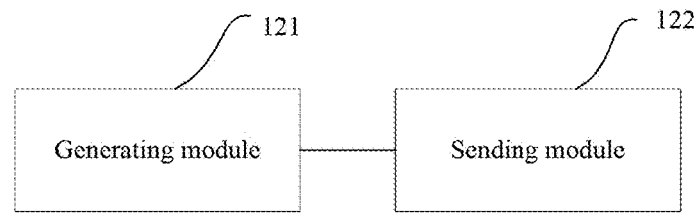
FIG. 12 is a schematic structural diagram of a network device according to a seventh embodiment of the present invention.

FIG. 12 is a schematic structural diagram of a network device according to a seventh embodiment of the present invention. The network shown in FIG. 12 includes: a generating module 121 and a sending module 122.

The generating module 121 may be configured to generate indication information including a reference time. The reference time is used for the base station to determine the scheduling period of suspending or resuming the MBMS service data, which may include, but is not limited to, a start time designated by a network side device, for the base station to determine, according to the start time indicated by the network side device, the scheduling period of suspending or resuming sending multimedia broadcast multicast service data; or, an MCCH modification period deviation value N, for the base station to determine, according to a start time of an Nth multicast control channel modification period after an multicast control channel modification period when a multicast control channel message is updated, the scheduling period of suspending or resuming sending the multimedia broadcast multicast service data, where N is an integer greater than or equal to 1. The sending module 122 may be configured to send the indication information to each base station in the same multimedia broadcast multicast service single frequency network area range, so as to instruct the base station to determine, according to the reference time, the scheduling period of suspending or resuming sending the multimedia broadcast multicast service data.

The network device provided in this embodiment indicates the reference time for determining the scheduling period of suspending or resuming sending the MBMS service data of a certain service to each base station in the same MBSFA, so that each base station in the same MBSFA can determine, according to the reference time, the same scheduling period of suspending or resuming sending the MBMS service data of the service; which realizes that these base stations synchronously suspend or resume sending the MBMS service data of the same service, thereby facilitating reducing interferences in the service. The network device provided in this embodiment may be, but is not limited to the MCE, and as for its working principle, reference can be made to the corresponding records of the corresponding embodiments in FIG. 2 and FIG. 4 to FIG. 10, which is not repeatedly described here again.

Further, an embodiment of the present invention further provides a communication system, and the communication system at least includes the base station as shown in FIG. 11 and the network device as shown in FIG. 12, where the base station and the network device are in communication connection. As for the working principle of the base station, reference can be made to the corresponding records of the corresponding embodiments in FIG. 1 and FIG. 4 to FIG. 10; and as for the working principle of the network device, reference can be made to the corresponding records of the corresponding embodiments in FIG. 2 and FIG. 4 to FIG. 10, which is not repeatedly described here again.

It should be understood by persons of ordinary skill in the art that the accompanying drawings are merely schematic diagrams of an embodiment, and modules or processes in the accompanying drawings are not necessarily required for implementing the present invention.

Those of ordinary skill in the art should understand that the modules in the apparatuses in the embodiments may be distributed in the apparatuses of the embodiments according to the description of the embodiments, and may also be allocated in one or multiple apparatuses which are different from those described in the embodiments after corresponding changes are performed. The modules in the foregoing embodiments may be combined into one module, and may also be further split into multiple submodules.

Finally it should be noted that the foregoing embodiments are merely intended for describing the technical solutions of the present invention other than limiting the present invention. Although the present invention is described in detail with reference to the foregoing embodiments, persons of ordinary skill in the art should understand that they can still make modifications to the technical solutions recorded in the foregoing embodiments or make equivalent replacements to some technical features in the technical solutions, and these modifications or replacements do not make the essence of the corresponding technical solutions depart from the spirit and scope of the technical solutions of the embodiments of the present invention.

What is claimed is:

1. A method for transmitting multimedia broadcast multicast service data, the method comprising:
    receiving, by a base station, from a multi-cell/multicast coordination entity (MCE), indication information indicating a multicast control channel modification period when a multicast control channel is updated; and
    sending, by the base station, multimedia broadcast multicast service data in a scheduling period determined according to the indication information,
    wherein the scheduling period is a same scheduling period in which another base station resumes sending the multimedia broadcast multicast service data in a same multimedia broadcast multicast service single frequency network (MBSFN) area.

2. The method according to claim 1, wherein the scheduling period is an Mth scheduling period of a multicast channel that bears the multimedia broadcast multicast service data from a start time of the multicast control channel modification period when the multicast control channel is updated, wherein M is an integer greater than or equal to 1.

3. The method according to claim 2, wherein M is preconfigured by a network management system.

4. The method according to claim 1, wherein the scheduling period is a scheduling period within the multicast control channel modification period when the multicast control channel is updated.

5. The method according to claim 1, further comprising:
    receiving, by the base station from the MCE, an instruction instructing the base station to determine a quantity of user equipment devices receiving the multimedia broadcast multicast service data, wherein the quantity of user equipment devices is used for the MCE to determine the base station to send the multimedia broadcast multicast service data; and
    notifying, by the base station to the MCE, the quantity of the user equipment devices.

6. A base station, comprising: a receiver, a processor and a memory;
    wherein the receiver is configured to receive from a multi-cell/multicast coordination entity (MCE) indication information indicating a multicast control channel modification period when a multicast control channel is updated;
    wherein the memory comprises programming instructions to be executed in the processor, the programming instructions configured to:
        send multimedia broadcast multicast service data in a scheduling period determined according to the indication information;
    wherein the scheduling period is a same scheduling period in which another base station resumes sending the multimedia broadcast multicast service data in a same multimedia broadcast multicast service single frequency network (MBSFN) area.

7. The base station according to claim 6, wherein the scheduling period is an Mth scheduling period of a multicast channel that bears the multimedia broadcast multicast service data from a start time of the multicast control channel modification period when the multicast control channel is updated, wherein M is an integer greater than or equal to 1.

8. The base station according to claim 7, wherein M is preconfigured by a network management system.

9. The base station according to claim 6, wherein the scheduling period is a scheduling period within the multicast control channel modification period when the multicast control channel is updated.

10. The base station according to claim 6,
    wherein the receiver is further configured to receive from the MCE, an instruction instructing the base station to determine a quantity of user equipment devices receiving the multimedia broadcast multicast service data, wherein the quantity of user equipment devices is used for the MCE to determine the base station to resume sending the multimedia broadcast multicast service data; and
    wherein the programming instructions is further configured to notify to the MCE, the quantity of the user equipment devices.

11. A multi-cell/multicast coordination entity (MCE) comprising:
    a processor;
    a memory storing program instructions to be executed in the processor, the instructions configured to cause the processor to generate indication information indicating a multicast control channel modification period when a multicast control channel is updated; and
    a transmitter configured to send the indication information to a base station in a multimedia broadcast multicast service single frequency network (MBSFN) area, wherein the indication information is used for the base station to determine a scheduling period of sending multimedia broadcast multicast service data;
    wherein the scheduling period is a same scheduling period in which another base station resumes sending the multimedia broadcast multicast service data in the same MBSFN area.

12. The MCE according to claim 11, wherein the scheduling period is an Mth scheduling period of a multicast channel that bears the multimedia broadcast multicast service data from a start time of the multicast control channel modification period when the multicast control channel is updated, wherein M is an integer greater than or equal to 1.

13. The MCE according to claim 12, wherein M is preconfigured by a network management system.

14. The MCE according to claim 11, wherein the scheduling period is a scheduling period within the multicast control channel modification period when the multicast control channel is updated.

15. The MCE according to claim 11,
    wherein the transmitter is further configured to send an instruction instructing the base station to determine a quantity of user equipment devices receiving the multimedia broadcast multicast service data; and
    wherein the instructions are further configured to cause the processor to determine the base station to send the multimedia broadcast multicast service data according to the quantity of user equipment devices received from the base station.

* * * * *